US009933026B2

(12) United States Patent
Shiozaki et al.

(10) Patent No.: US 9,933,026 B2
(45) Date of Patent: Apr. 3, 2018

(54) VEHICLE CONTROL SYSTEM

(71) Applicant: TOYOTA JIDOSHA KABUSHIKI KAISHA, Toyota-shi, Aichi-ken (JP)

(72) Inventors: Junichi Shiozaki, Yokohama (JP); Norimi Asahara, Numazu (JP); Mitsuhiro Toyoda, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/419,510

(22) Filed: Jan. 30, 2017

(65) Prior Publication Data
US 2017/0219029 A1  Aug. 3, 2017

(30) Foreign Application Priority Data

Feb. 1, 2016 (JP) .................................. 2016-017030

(51) Int. Cl.
*F16D 48/06* (2006.01)
*F16D 25/00* (2006.01)

(52) U.S. Cl.
CPC .......... *F16D 48/066* (2013.01); *F16D 25/00* (2013.01); *F16D 2300/22* (2013.01); *F16D 2500/1026* (2013.01); *F16D 2500/10412* (2013.01); *F16D 2500/3065* (2013.01); *F16D 2500/30401* (2013.01); *F16D 2500/30412* (2013.01); *F16D 2500/3109* (2013.01); *F16D 2500/50287* (2013.01); *F16D 2500/50293* (2013.01)

(58) Field of Classification Search
CPC .... F16D 48/06; F16D 48/066; F16D 2300/22; F16D 2500/30421; F16D 2500/30425; F16D 2500/3065; F16D 2500/50287; F16D 2500/50293
See application file for complete search history.

(56) References Cited

U.S. PATENT DOCUMENTS

| 6,594,573 B1 * | 7/2003 | Rossmann | F16D 48/066 477/166 |
| 2005/0049761 A1 | 3/2005 | Kataoka et al. | |
| 2007/0294017 A1 * | 12/2007 | Joshi | F16D 48/06 701/67 |
| 2012/0081051 A1 * | 4/2012 | Kobayashi | B60K 6/48 318/400.23 |

FOREIGN PATENT DOCUMENTS

| JP | 2005-147238 A | 6/2005 |
| JP | 2006-046354 A | 2/2006 |
| JP | 2008-215580 A | 9/2008 |
| JP | 4356305 B2 | 11/2009 |

\* cited by examiner

*Primary Examiner* — Edwin A Young
(74) *Attorney, Agent, or Firm* — Andrews Kurth Kenyon LLP

(57) ABSTRACT

A vehicle control system for improving vibration suppressing performance and acceleration response is provided. A controller is configured to set the torque transmitting capacity of an engagement device to a first torque transmitting capacity that is smaller than a value required to transmit a peak value of a second drive torque applied to an output shaft of a transmission having the engagement device but greater than a value required to transmit an estimated first drive torque generated by an engine, when the second drive torque is amplified by pulsation of the first drive torque.

12 Claims, 13 Drawing Sheets

VEHICLE CONTROL SYSTEM

CROSS REFERENCE TO RELATED APPLICATIONS

The present invention claims the benefit of Japanese Patent Application No. 2016-017030 filed on Feb. 1, 2016 with the Japanese Patent Office, the disclosures of which are incorporated herein by reference in its entirety.

BACKGROUND

Field of the Invention

Embodiments of the present application relate to the art of a vehicle control system including engagement mechanisms including a clutch and a brake between a prime mover and drive wheels, and particularly to the art of a vehicle control system for reducing torsional vibrations caused in the vehicle.

Discussion of the Related Art

Japanese Patent Publication No. 4356305 describes a vehicle control system for correcting input commands of an acceleration pedal operation and the like by feedback gain set on the basis of vertical behaviors of a vehicle found by a motion model of vibrations of the vehicle body in order to realize optimum vibration control of the vehicle body. Thereby, the motion model which is rapid in responsiveness for correcting a command as cause of vibrations and which dynamically models the vibrations of the vehicle body is used thereby to accurately correct the input commands. Thus, even when the input commands causing vibrations of the vehicle body are continuously made, the vibrations can be rapidly controlled without being scattered.

JP-A-2005-147238 describes a hydraulic control system in an automatic transmission which determines a switch between a drive state in which an engine rotation frequency is higher than an input rotation frequency and a driven state in which the input rotation frequency is higher than the engine rotation frequency and corrects a hydraulic pressure supplied to a frictional engagement element on the engagement side of the transmission on the basis of the determination result in order to reduce the occurrences of shift shock.

JP-A-2008-215580 describes a vehicle control device and method for increasing a command value in a stepwise manner for controlling hydraulic supply to frictional engagement elements provided in a transmission when a condition indicating a delay of the progress of gear shift (sweep condition) is established, and decreasing a command value in a stepwise manner when a predetermined time elapses in order to prevent a delay in gear shift time during power on/down shift and a gear shift shock from occurring. According to the teachings of JP-A-2008-215580, when it is determined that a power-down shift request is made, backlash elimination control is performed on the frictional engagement element on the engagement side and constant-pressure standby control is performed on the frictional engagement element on the engagement side after the backlash reduction control. The "backlash elimination control" is directed for increasing a command value for the frictional engagement element on the engagement side in a stepwise manner until a predetermined time elapses, and rapidly moving the frictional engagement element until immediately before its engagement.

JP-A-2006-46354 describes a vehicle control system for determining whether rattling is caused due to backlash elimination, and controlling an engagement force between frictional engagement elements such that when it is determined that rattling is caused, an engagement time from the released state of the frictional engagement elements to the engaged state is longer than that when it is determined that backlash rattling is not caused in order to restrict shock due to rattling.

However, a vehicle control system for correcting input commands by feedback gain set on the basis of vertical behaviors of a vehicle found by a motion model of vibrations of a vehicle body is more advantageous in vibration control than when feedback is performed after a vibration is caused, but acceleration responsiveness expected by a driver may not be met when an input command for acceleration pedal operation is changed, for example. Thus, vibration suppressing performance to suppress vibrations of the vehicle resulting from torque pulse, and acceleration response of the vehicle are required to be improved.

SUMMARY

Aspects of embodiments of the present application have been conceived noting the foregoing technical problems, and it is therefore an object of embodiments of the present invention is to provide a vehicle control system for improving both vibration suppressing performance and acceleration response.

The present application relates to a vehicle control system, comprising: an engagement device that is disposed on a power transmission route between a prime mover and drive wheels, and that is engaged to transmit first drive torque generated by the prime mover to the drive wheels and disengaged to interrupt transmission of the first drive torque; a control unit that controls hydraulic pressure applied to the engagement device thereby changing a torque transmitting capacity of the engagement device; and a vibration controller that reduces torsional vibrations of a vehicle. In order to achieve the above-mentioned objective, according to the preferred embodiment of the present application, the vibration controller is configured to set the torque transmitting capacity of the engagement device to a first torque transmitting capacity that is smaller than a value required to transmit a peak value of a second drive torque applied to an output shaft of a transmission having the engagement device but greater than a value required to transmit an estimated first drive torque, when the second drive torque is amplified by pulsation of the first drive torque.

In a non-limiting embodiment, the vibration controller may be further configured to increase the first torque transmitting capacity with an increase in amplification of the second drive torque resulting from backlash reduction in at least one pair of engagement element arranged in the power transmission route. For example, output shaft torque of the transmission is raised abruptly due to backlash reduction in the engagement element. Specifically, the peak value of the second drive torque is increased as a result of the backlash reduction. That is, a torsional reaction force may be increased by increasing the torque transmitting capacity of the engagement device to reduce a required time to engage the engagement device.

In a non-limiting embodiment, the vibration controller may be further configured to set the torque transmitting capacity of the engagement device to a second torque transmitting capacity that is greater than a value required to transmit the estimated first drive torque but smaller than the first torque transmitting capacity. According to the embodiment, therefore, engagement shock of the engagement device may be reduced in comparison with a case in which the engagement device is engaged with the first torque transmitting capacity.

In a non-limiting embodiment, the vibration controller may be further configured to convert the estimated first drive torque to a rate of torsional change, and to set the torque transmitting capacity of the engagement device to the second torque transmitting capacity, if the rate of torsional change resulting from an amplification of the first drive torque is equal to or greater than a predetermined threshold value. According to the embodiment, therefore, the vibration suppressing control can be carried out appropriately while estimating the rate of torsional change based on the estimated first drive torque.

In a non-limiting embodiment, the vibration controller may be further configured to adjust the first torque transmitting capacity to be smaller than a value required to transmit the peak value of the second drive torque by multiplying the estimated first drive torque by a torque amplification rate. Specifically, the torque amplification rate may be determined based on a backlash coefficient of the engagement element. To this end, the backlash coefficient may be determined based on: a difference between an input speed and an output speed of the engagement device; a required time to eliminate the speed difference; and a gear stage of the transmission.

According to the present invention, when the second drive torque is amplified, the first torque transmitting capacity is set to be higher than the estimated first drive torque and lower than the peak value of the second drive torque along with amplification of the second drive torque. For this reason, when the second drive torque exceeds the first transmission torque capacity, the engagement device is brought into a slip state, and an inertia moment of an engine can be separated from an output system of downstream side of the engagement device. Consequently, a vibration of low frequency component of the first drive torque can be converted into a vibration of high frequency component at which a driver does not feel a vibration.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
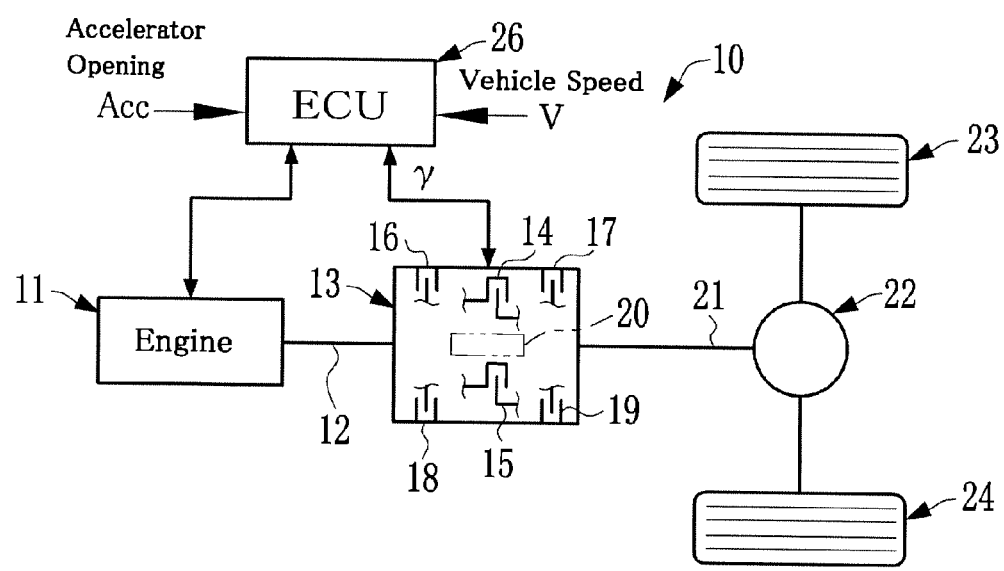
FIG. 1 is a schematic illustration showing an exemplary vehicle to which the present invention is applied.

A preferred embodiment of the present application will now be explained with reference to the accompanying drawings. FIG. 1 illustrates an exemplary vehicle 10 to which the embodiment of the present application is applied. As illustrated in FIG. 1, the vehicle 10 includes an engine 11 serving as a prime mover, an automatic transmission 13, and an electronic control unit (which will be denoted as ECU hereinafter) 26. For example, an internal-combustion engine such as a gasoline engine and a diesel engine, a motor, a hybrid drive unit of an internal-combustion engine and a motor may be used as the prime mover. The engine 11 is configured such that at least output torque is electrically controlled. For example, a gasoline engine includes an electronic throttle valve so that a throttle position is electrically controlled to set output torque depending on the amount of intake air. The prime mover includes a device such as torque converter for generating torque applied to the automatic transmission 13.

The automatic transmission 13 includes an input shaft 12, a plurality of frictional engagement devices 14 to 19, a transmission gear mechanism 20, and an output shaft 21. The input shaft 12 inputs first drive torque output from the engine 11 into the transmission gear mechanism 20. The engagement devices 14 to 19 include a clutch and a brake. A gear stage of the transmission gear mechanism 20 is shifted among a plurality of stages by manipulating the engagement devices 14 to 19 to change a transmission route, and the first drive torque is delivered to the output shaft 21 through the transmission gear mechanism 20 while being increased or decreased. For example, the first engagement device 14 and the second engagement device 15 are engaged with each other so that a predetermined gear stage is set. The first engagement device 14 includes a clutch device for connecting rotary elements on the input side and the output side or disconnecting the rotary elements, and a brake mechanism for connecting the rotary element to a predetermined stationary member or disconnecting the rotary element from the stationary member. The second engagement device 15 has the same or similar configuration as or to the first engagement device 14. Second drive torque outputted from the output shaft 21 is transmitted to a differential gear 22 serving as a final reduction gear, and the first drive torque transmitted to the differential gear 22 is transmitted from the differential gear 22 to the right and left drive wheels 23 and 24. The first engagement device 14 and the second engagement device 15 are exemplary engagement devices. The output shaft 21 includes a drive shaft.

The ECU 26 is configured to control the engine 11 and the automatic transmission 13, and comprises a controller for the engine 11 and a controller for the automatic transmission 13. The ECU 26 may also be divided into the engine control unit and the transmission control unit. The ECU 26 is mainly configured of a microcomputer, and makes calculations on the basis of preinstalled maps, data and programs as well as incident data. The ECU 26 is configured to output a calculation result in the form of command signal to the engine 11 and the automatic transmission 13. The maps are prepared based on experiments or simulations to determine target values in accordance with predetermined parameters. The maps include a shifting diagram for shifting the gear stage, a drive force map for determining a drive force in accordance with a drive demand of the driver, and a map for determining a required torque transmitting capacities of the engagement device such as requested values of transmission mechanisms including the first engagement device 14 and the second engagement device 15. For example, a vehicle speed V, an accelerator opening Acc, a gear ratio γ of the automatic transmission 13 etc. are sent to the ECU 26.

Figure 2:
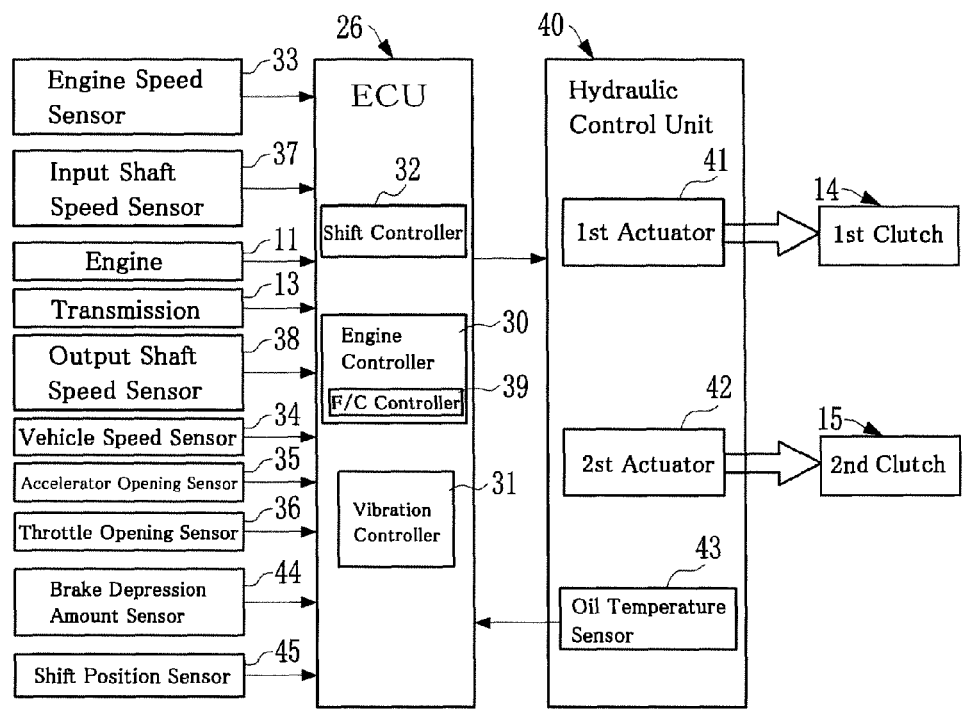
FIG. 2 is an explanatory diagram showing an exemplary configuration of an ECU.

FIG. 2 is an explanatory diagram illustrating an exemplary configuration of the ECU 26. The ECU 26 includes an engine controller 30, a vibration controller 31, and a shift controller 32. The ECU 26 is connected with an engine speed sensor 33 for detecting a rotational speed of the engine 11, an input shaft speed sensor 37 for detecting a rotational speed of the input shaft 12, an output shaft speed sensor 38 for detecting a rotational speed of the output shaft 21, a vehicle speed sensor 34 for detecting a vehicle speed, an accelerator position sensor 35 for detecting depression of the acceleration pedal, a throttle sensor 36 for detecting an opening degree of a throttle valve of the engine 11, a brake sensor 44 for detecting a depression of the brake pedal, and a shift position sensor 45 for detecting a position of a shift lever. Detection signals of those sensors, as well as information about an execution of a fuel-cut (F/C) control, an engagement state of a lockup clutch (L/U), a gear stage of the automatic transmission 13 etc. are transmitted to the ECU 26.

The engine controller 30 is configured to: control an opening degree of an electronic throttle valve to achieve a required engine torque (which will be denoted as "target engine torque" hereinafter); control an injection amount of air/fuel mixture of a fuel injector to cylinders of the engine 11; and transmit a command signal to an ignition device to control an ignition timing of the engine 11. The engine controller 30 is further configured to: calculate a required drive force based on an actual accelerator opening Acc and an actual vehicle speed V with reference to a drive force map in which a relationship among the accelerator opening Acc, the vehicle speed V, and the required drive force is determined; and calculate a target engine torque to achieve a required drive force on the basis of tire effective radii of the drive wheels 23 and 24, a current gear ratio of the automatic transmission 13, a final reduction gear ratio in the power transmission route (including the differential gear 22) between the output shaft 21 and the drive wheels 23 and 24. The engine controller 30 includes a fuel-cut controller (abbreviated as the "F/C controller" hereinafter) 39 for executing the fuel-cut control for stopping fuel supply to the engine 11 upon satisfaction of a predetermined fuel-cut condition.

The shift controller 32 is configured to control a shifting operation of the gear stage of the automatic transmission 13. For example, the shift controller 32 executes the shifting operation with reference to a shifting diagram for executing the shifting operation based on an actual vehicle speed V and an actual accelerator opening Acc. When a condition to execute the shifting operation of the automatic transmission 13 is satisfied, the shift controller 32 transmits hydraulic command to a hydraulic control unit 40 to manipulate the first engagement device 14 and the second engagement device 15 in such a manner as to establish a desired gear stage.

The hydraulic control unit 40 is configured to control hydraulic pressures (i.e., engagement pressures) applied to the first engagement device 14 and the second engagement device 15 in accordance with command values. Specifically, the hydraulic control unit 40 includes a first actuator 41 and a second actuator 42 for continuously changing the torque capacities or engagement torque of the first engagement device 14 and the second engagement device 15 depending on the hydraulic pressure applied to those engagement devices. For example, the first actuator 41 changes the hydraulic pressure applied to the first engagement device 14 depending on the hydraulic command thereby controlling the torque capacity of the first engagement device 14. Likewise, the second actuator 42 changes the hydraulic pressure applied to the second engagement device 15 depending on the hydraulic command thereby controlling the torque capacity of the second engagement device 15. The hydraulic control unit 40 further includes an oil temperature sensor 43 for detecting a temperature of operating oil, and transmits information about a temperature of the operating to the ECU 26. When the oil temperature exceeds a predetermined threshold, the ECU 26 determines a satisfaction of a prohibition condition of an engagement of a predetermined engagement device. For example, a hydraulic actuator or an electrical actuator may be used as the actuators 41 and 42.

The torque transmitting capacities of the first engagement device 14 and second engagement device 15 are governed by a friction coefficient of a frictional material of friction plates thereof and an engagement pressure applied to the friction plate. The hydraulic control unit 40 controls the engagement pressures applied to the first engagement device 14 and the second engagement device 15 thereby changing torque transmitting capacities of the first engagement device 14 and the second engagement device 15. In order to transmit first drive torque between the input shaft 12 and the output shaft 21 without causing slippage of the first engagement device 14 and the second engagement device 15 while increasing engagement pressures of the engagement devices, a torque capacities of the first engagement device 14 and the second engagement device 15 have to be individually increased to a level such that the input shaft 12 and the output shaft 21 are allowed to rotate at a same speed. Given that a speed difference between the input shaft 12 and the output shaft 21 is substantially zero, a speed difference between an input rotary element and an output rotary element of the first engagement device 14, and a speed difference between an input rotary element and an output rotary element the second engagement device 15 are reduced to substantially zero.

Figure 3:
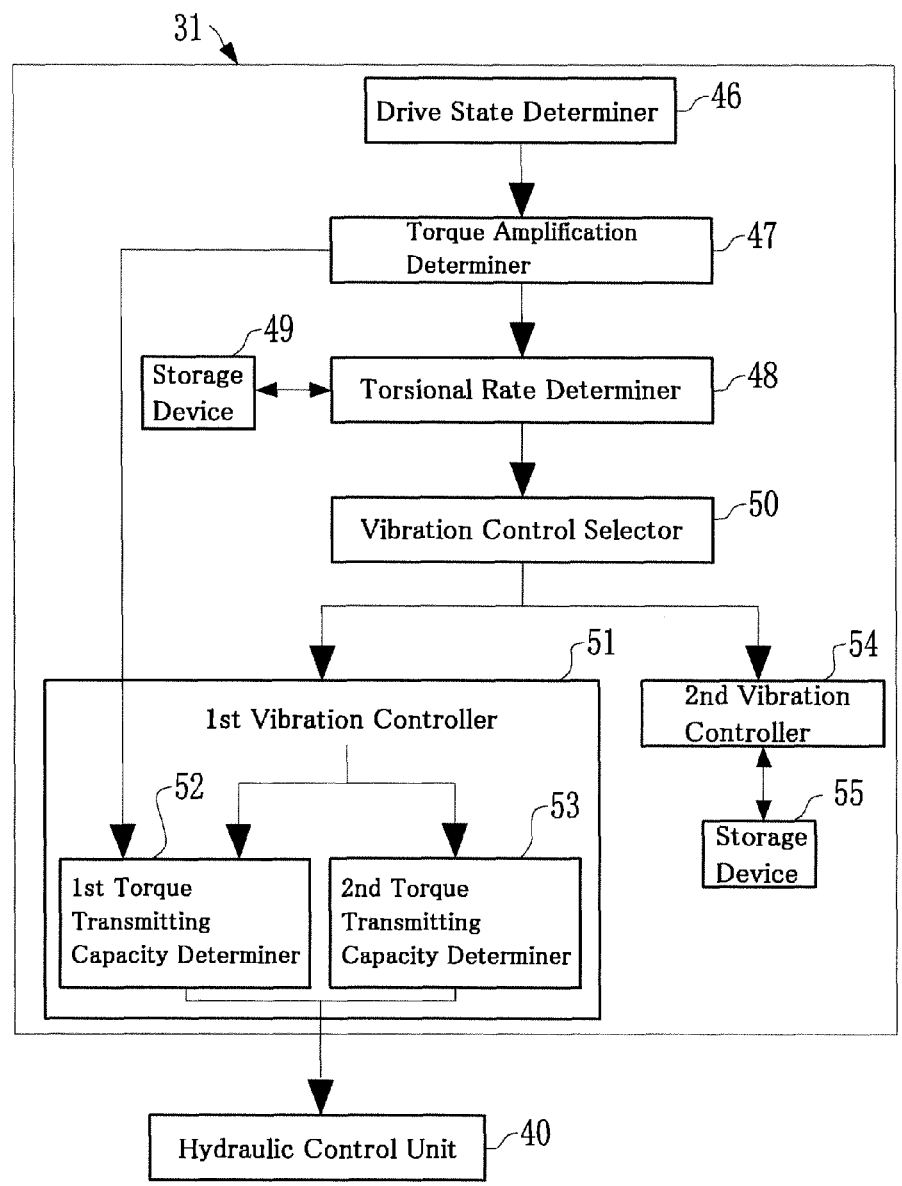
FIG. 3 is an explanatory diagram showing a configuration of a vibration control device.

FIG. 3 is an explanatory diagram illustrating a configuration of the vibration controller 31. As illustrated in FIG. 3, the vibration controller 31 includes a drive state determiner 46, a torque amplification rate determiner 47, a torsional change determiner 48, a vibration control selector 50, a first vibration controller 51, a second vibration controller 54, a first torque transmitting capacity determiner 52, and a second torque transmitting capacity determiner 53.

The drive state determiner 46 constantly detects the speed difference between the input shaft 12 and the output shaft 21 to determine whether the vehicle is in a drive state or a driven state. Specifically, the drive state determiner 46 determines if the speed difference between the input shaft 12 and the output shaft 21 is changed from a positive value to a negative value or changes from a negative value to a positive value. The torque amplification rate determiner 47 constantly observes a target engine torque, a gear stage (gear ratio) set in the automatic transmission 13, an engine speed, and a vehicle speed so as to determine a switch between the drive state and the driven state based on such information. When the drive state is switched between the drive state and the driven state, the torque amplification rate determiner 47 computes an estimated torque amplification rate of the second drive torque on the output shafts of the engagement devices 14 and 15 in the event of e.g., a backlash reduction in the torque transmitting route.

The torsional change determiner 48 observes the state information of the vehicle 10 and the information about the driver's operations, and estimates a magnitude of vibration governed by the torsional rate and the amount of change in the torsion of the output shaft 21 on the basis of the information about factors of varying the first drive torque such as a change in the drive state of the vehicle 10 and the driver's operation. The torsional change determiner 48 includes a storage device 49 for storing a torsion rate. The change in the torsion is computed based on a difference between the previous torsion rate stored in the storage device 49 and a currently estimated torsion rate. The information about the state of the vehicle 10 includes a target engine torque, an execution of the F/C control, and an engagement state of the lockup clutch of the torque converter, and a gear stage of the automatic transmission 13. The information about the driver's operations includes an opening degree of the accelerator, a depression of the brake pedal, and a shift position.

The first vibration controller 51 and the second vibration controller 54 are configured to execute different kinds of vibration suppressing control, and the vibration control selector 50 is configured to select one of the first vibration controller 51 and the second vibration controller 54 depending on the magnitude of vibration and the rate of torsional change determined by the torsional change determiner 48, a drive force required by the driver, and a satisfaction of the prohibition condition, and to transmit a command signal to the selected vibration controller. If the current condition is does not meet any of control contents of the first vibration controller 51 and the second vibration controller 54, the vibration control selector 50 will not execute the vibration suppressing control.

A program for executing a slip control is installed in the first vibration controller 51 so that the first vibration controller 51 executes the slip control upon reception of an execution commend. By thus carrying out the slip control by the first vibration controller 51, the first torque transmitting capacity determiner 52 is allowed to determine a first torque transmitting capacity (represented by "B" in FIG. 4) of the first engagement device 14 or the second engagement device 15, and the second torque transmitting capacity determiner 53 is allowed to determine a second torque transmitting capacity of the first engagement device 14 or the second engagement device 15. As described later, the first torque transmitting capacity is maintained until the second drive torque exceeds the first drive torque (to cause a slip), and set to a level lower than a peak value (represented by "C" in FIG. 4) of the second drive torque (indicated by the solid curve as the output shaft drive torque in FIG. 4) being amplified along with fluctuation in the first drive torque, but higher than the estimated first drive torque (indicated by the broken line E in FIG. 4). If the second drive torque is not amplified, the second drive torque is equivalent to the first drive torque. The torque transmitting capacity of the first engagement device 14 or the second engagement device 15 is switched by second torque transmitting capacity determiner 53 to the second torque transmitting capacity when the first drive torque exceeds the first torque capacity, that is, when engaging the slipping engagement devise. Specifically, the second torque transmitting capacity is set to a level higher than the estimated first drive torque but lower than the first torque transmitting capacity.

Thus, the first torque transmitting capacity is set to be a higher value than the estimated first drive torque so that the slipping amount of the frictional material of the first engagement device 14 and the second engagement device 15 can be reduced to limit damage on the engagement device. By thus reducing the slipping amount, a torsional reaction force can be increased and hence the engagement device can be engaged easily. The second drive torque is amplified when the drive state is switched between the drive state in which the drive wheels 23 and 24 are rotated by the engine 11 and the driven state in which the engine 11 is rotated by the torque delivered from the drive wheels 23 and 24. When the drive state is switched between the drive state and the driven state, for example, when the F/C control is commenced or terminated, a backlash (i.e., a clearance or play) existing in a gear pair arranged between the engine 11 and the drive wheels 23, 24 is reduced and hence d the second drive torque is amplified.

In the hydraulic control unit 40, hydraulic command is transmitted from the ECU 26 to the first actuator 41 and the second actuator 42. Specifically, the first torque transmitting capacity and the second torque transmitting capacity are established by generating engagement pressures by the first actuator 41 and the second actuator 42 based on the hydraulic command, and applying the generated engagement pressures to hydraulic servos of the first engagement mechanism 14 and the second engagement mechanism 15. In the vehicle 10, a plurality of engagement devices such as the first engagement device 14 and the second engagement device 15 are subjected to a sensitive slip control. In order to execute the slip control of the engagement devices 14 and 15, a contribution ratio of the first engagement device 14 to transmit an output torque of the engine 11 is determined based on a gear ratio between gears of input side and output side of the first engagement device 14, and a contribution ratio of the second engagement device 15 to transmit the output torque of the engine 11 is determined based on a gear ratio between gears of input side and output side of the second engagement device 15. Then, a target torque transmitting capacity of the first engagement device 14 and a target torque transmitting capacity of the second engagement device 15 are determined based on the contribution ratio of each of the first engagement device 14 and the second engagement device 15.

A backlash reduction control program is stored in the second vibration controller 54, and the second vibration controller 54 executes the backlash reduction control in response to an execution command. Specifically, in order to improve not only vibration control performance but also acceleration response, the second vibration controller 54 detects an elimination of the backlash existing between the gears mating to each other based on a difference between an input speed and an output speed of the gear pair, and adjusts an increasing rate of the target engine torque after the backlash is eliminated.

Figure 4:
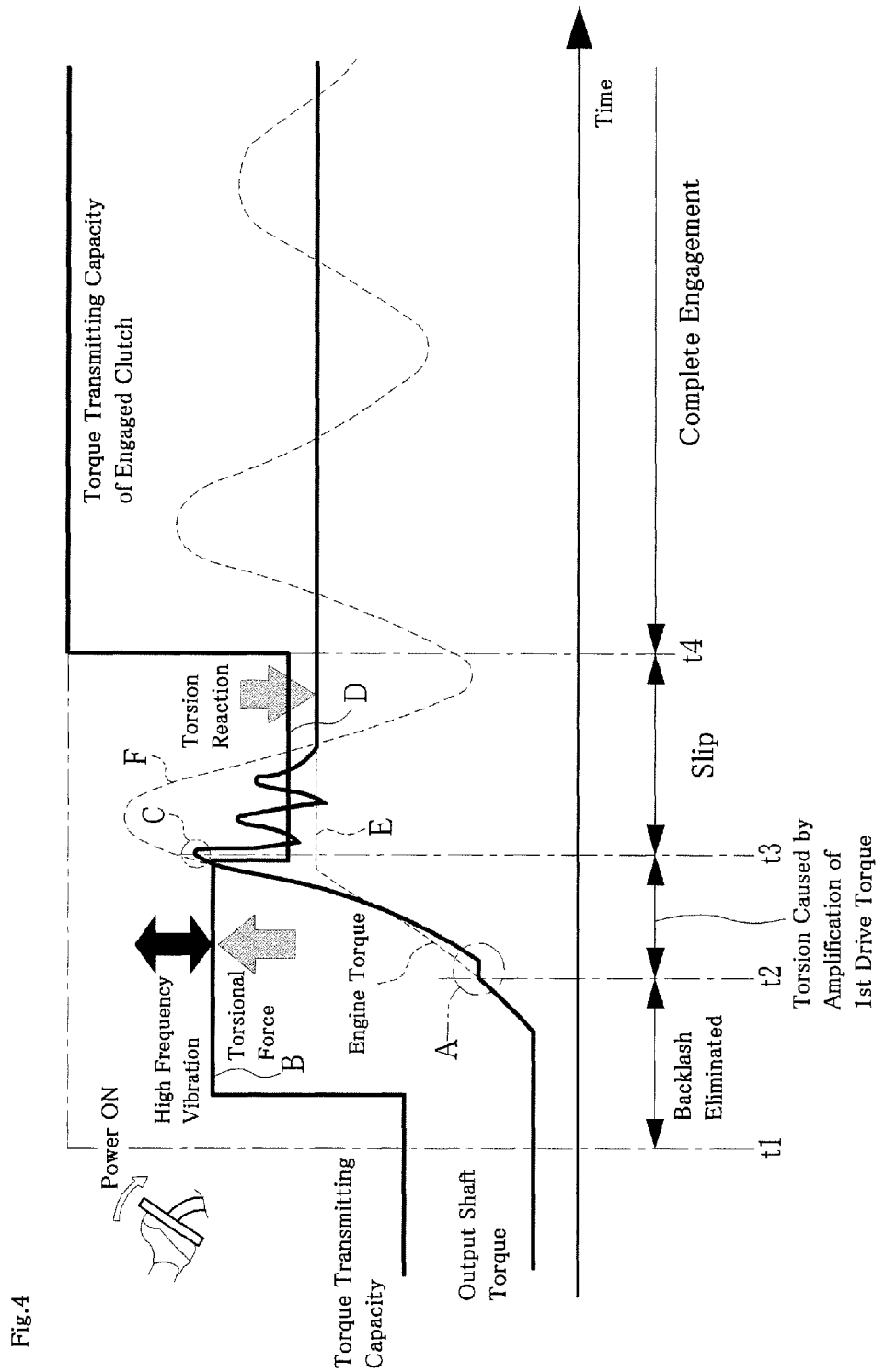
FIG. 4 is an explanatory diagram showing the effects when slip control is performed as vibration control.

FIG. 4 is a time chart showing the effects when the first vibration controller 51 performs the slip control. The vibration controller 31 is configured to set a torque transmitting capacity of the first engagement device 14 or the second engagement device 15 (be simply called the "engagement device" hereinafter) to a level at which the engagement device is allowed to cause a slight slip when the second drive torque is amplified by backlash reduction. In the example shown in FIG. 4, at point t1, the acceleration pedal is depressed to power the coasting vehicle. Consequently, the backlash is reduced from the point t1, and eliminated at point t2 (as indicated by "A" in FIG. 4). When backlash is eliminated, the second drive torque is amplified and torsional vibrations are generated as indicated by the broken line F. In this situation, the torque transmitting capacity of the engagement device is set to the first torque transmitting capacity (represented by "B") based on the target engine torque and the like. Specifically, the first transmission torque capacity is obtained by multiplying the estimated first drive torque (i.e., an engine drive torque represented by "E") by a backlash coefficient (or play coefficient). The backlash coefficient is determined based on at least one of the difference between an input speed and an output speed of the gear pair, a length of time until the speed difference is eliminated, and a gear stage (or gear ratio). The backlash coefficient corresponds to a torque amplification rate to be explained at step S3 in FIG. 6.

The second drive torque is amplified after backlash is eliminated at point t2. At point t3, the second drive torque exceeds the first transmission torque capacity of the engagement device, and consequently a slight slip is caused in the engagement device. In this situation, the torque transmitting capacity of the engagement device is set to a level possible to transmit the first drive torque of the engine 11. Therefore, if the torque transmitting capacity of the engagement device is maintained to the first torque capacity, an engagement shock may be caused by engaging the engagement device. In order to prevent an occurrence of such engagement shock, at point t3, the torque transmitting capacity of the engagement device is set to the second torque transmitting capacity (represented by "D") by slightly reducing the engagement pressure applied to the engagement device. The slight slip of the engagement device may be detected based on a speed difference between the input member and the output member of the engagement device.

It is preferable to set the first torque transmitting capacity to the current estimated first drive torque (indicated by the dashed line E). However, if hydraulic pressure applied to the engagement device is lowered than the current first drive torque due to fluctuation in the hydraulic pressure, it is not possible to secure a torque transmitting capacity required to transmit the estimated first drive. For this reason, the second torque transmitting capacity is set to a level slightly higher than the current estimated first drive torque taking account of the hydraulic fluctuation. According to the embodiment, therefore, the engagement device such as the first engagement device 14 and the second engagement device 15 may be engaged smoothly while preventing an occurrence of engagement shock.

Thus, at point t3, the output shaft 21 is released from an inertia force applied from member of upstream side of the engagement devices 14 and 15 such as the engine 11. Consequently, low frequency component of the torsional vibrations (represented by "F") possible to be sensed as longitudinal vibrations by a passenger may be converted into insensible high frequency component. By thus suppressing the vibrations by causing the slight slip of the engagement device, a torsional reaction force may be further increased to reduce a required time to engage the engagement device. In addition, since the torque transmitting capacity of the engagement device is reduced after the slip of the engagement device is caused at time t3, jerking of the output shaft is eliminated to reduce pulsation of the second drive torque even if the engagement device is engaged.

Figure 5:
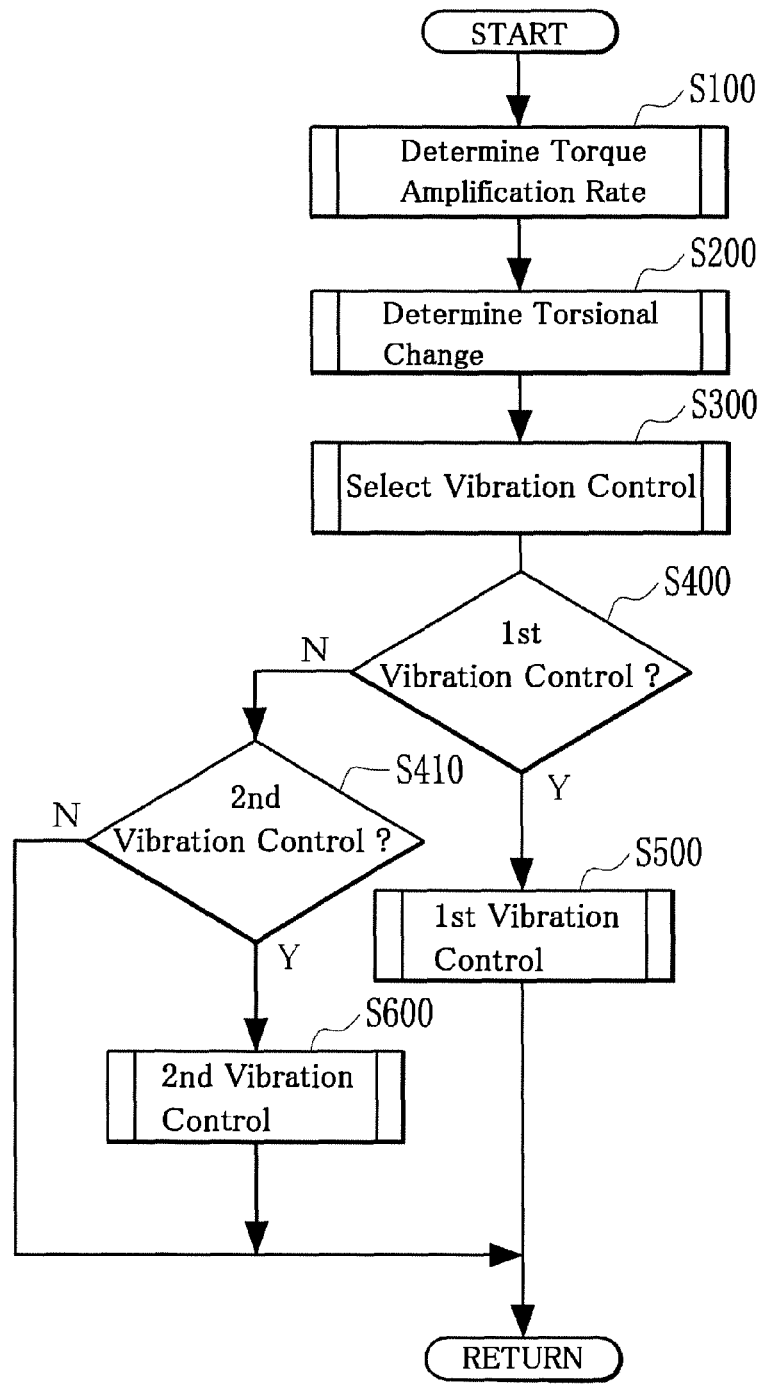
FIG. 5 is a flowchart for explaining an operation procedure of the vibration controller.

FIG. 5 is a flowchart for explaining an operation procedure of the vibration control unit 31. The operations illustrated in FIG. 5 are repeatedly performed at certain time intervals as long as the engine 11 is in operation. At step S100, the torque amplification rate determiner 47 determines a torque amplification rate by estimating amplification of the second drive torque resulting from backlash reduction. At step S200, the torsional change determiner 48 determines a torsional change between the input shaft 12 and the output shaft 21 to estimate a magnitude of the torsional vibration, on the basis of the torsion rate between the input shaft 12 and the output shaft 21 and an amount of change in the torsion rate between the torsion rate detected during the previous routine and the torsion rate detected during the current routine. At step S300, the vibration control selector 50 selects the preferable vibration control to suppress the estimated vibration. Then, at step S400, it is determined whether or not the selected vibration control is the first vibration control. If the first vibration control is selected so that the answer of step S400 is YES, the routine proceeds to step S500 to perform the first vibration control as the slip control by the first vibration controller 51, and then returned. If the first vibration control is not selected so that the answer of step S400 is NO, the routine proceeds to step S410 to determine whether or not the selected vibration control is the second vibration control. If the second vibration control is selected so that the answer of step S410 is YES, the routine proceeds to step S600 to perform the second vibration control as the backlash reducing control by the second vibration controller 54, and then returned. If the second vibration control is not selected so that the answer of step S410 is NO, the routine is returned without executing any specific control by the vibration control selector 50.

Figure 6:
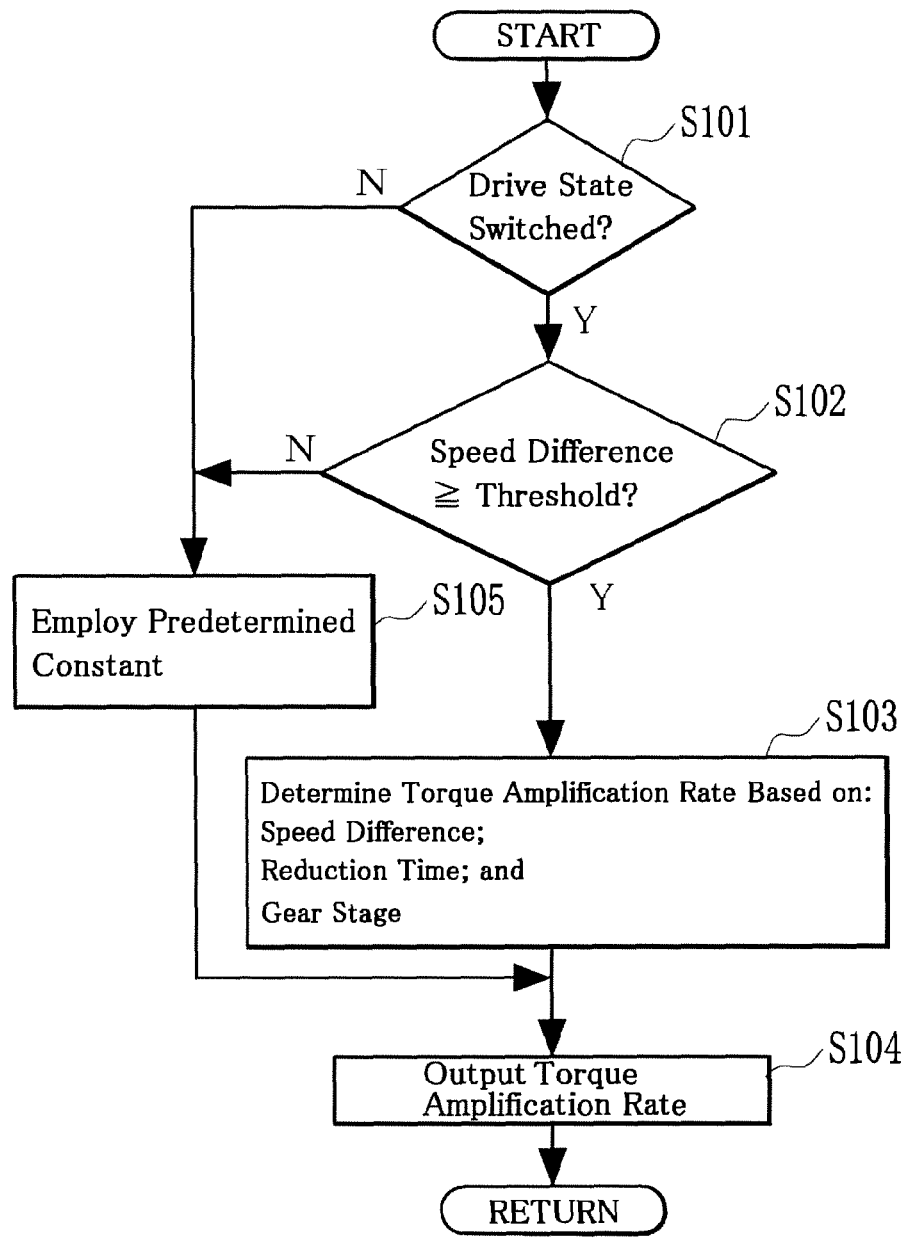
FIG. 6 is a flowchart illustrating an operation procedure of a drive state determiner and a torque amplification rate determiner.

FIG. 6 is a flowchart showing a subroutine of step S100 in FIG. 5 performed by the drive state determiner 46 and the torque amplification rate determiner 47. The operations of the drive state determiner 46 and the torque amplification rate determiner 47 illustrated in FIG. 6 are also performed repeatedly at certain time intervals as long as the engine 11 is in operation. At step S101, the drive state determiner 46 determines whether or not the drive state of the vehicle 10 is switched between the drive state and the driven state on the basis of a driving condition. If the drive state of the vehicle 10 is switched so that the answer of step S101 is YES, the routine proceeds to step S102. At step S102, the torque amplification rate determiner 47 determines whether or not the speed difference between the input shaft 12 and the output shaft 21 is greater than a predetermined threshold value. If the speed difference is greater than the threshold value so the answer of step S102 is YES, the routine proceeds to step S103. At step S103, the torque amplification rate is determined on the basis of at least one of the aforementioned speed difference, the length of time until the speed difference is reduced to substantially zero, and the gear stage of the automatic transmission 13, with reference to the map determining a relation between the torque amplification rate and those parameters. The torque amplification rate thus determined is used to determine the first transmission torque capacity. The length of time until the speed difference is reduced to substantially zero includes a required time to complete an engagement of the engagement device 14 or 15. Thereafter, at step S104, the torque amplification rate determiner 47 transmits the torque amplification rate. For example, the torque amplification rate is set to be a relatively greater value given that the gear stage is set to a low speed stage such as the first stage and the second stage, that the speed difference between the input shaft 12 and the output shaft 21 is large, that the input shaft 12 and the output shaft 21 are rotated at different speeds for long period of time, and that the input torque is relatively large.

By contrast, if the answer of step S101 or S102 is NO, a predetermined constant for the case in which the backlash is eliminated is employed at step S105, and the routine progresses to step S104.

Figure 7:
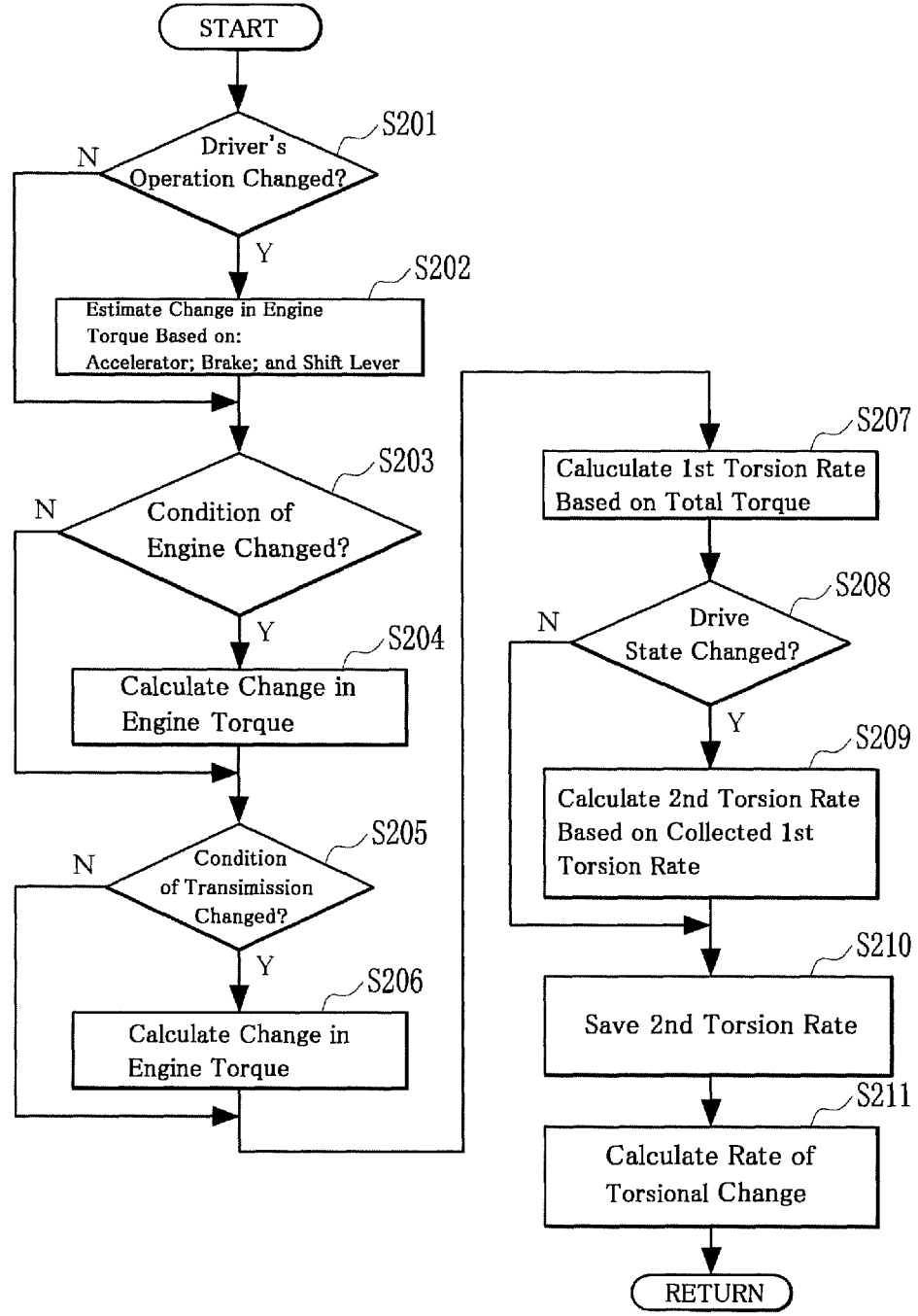
FIG. 7 is a flowchart illustrating an operation procedure of a rate of torsional change determiner.

FIG. 7 is a flowchart showing a subroutine of step S200 in FIG. 5 performed by the torsional change determiner 48. The operations of the torsional change determiner 48 illustrated in FIG. 6 are also performed repeatedly at certain time intervals as long as the engine 11 is in operation. At step S201, the torsional change determiner 48 determines whether or not the driver's operation is changed. The driver's operation includes operations of accelerator pedal to change an opening degree of the accelerator, the brake pedal for applying a braking force and the shift lever for electrically shifting the gear stage of the automatic transmission 13, and the torsional change determiner 48 is configured to always monitor those operations executed by the driver. If the driver's operation is changed so that the answer of step S201 is YES, the routine proceeds to step S202 to estimate a change in the engine torque on the basis of a change in at least any one of depression of the accelerator pedal, depression of the brake pedal, and position of the shift lever.

By contrast, if the driver's operation is not changed so that the answer of step S201 is NO, the routine skips step S202 and proceeds to step S203. At step S203, the torsional change determiner 48 determines whether or not an operating state of the engine 11 is changed. For example, an execution and a termination of the F/C control are determined. If the operating state of the engine 11 is changed so that the answer of step S203 is YES, the routine proceeds to step S204 to compute a change in the engine torque resulting from a change in the operating state of the engine 11.

By contrast, if the operating state of the engine 11 is not changed so that the answer of step S203 is NO, the routine skips step S204 and proceeds to step S205. At step S205, the torsional change determiner 48 determines whether or not an operating state of the automatic transmission 13 is changed. The change in the operating state of the automatic transmission 13 includes a shifting operation of the gear stage. If the operating state of the automatic transmission 13 is changed so that the answer of step S205 is YES, the routine proceeds to step S206 to compute a change in the engine torque resulting from a change in the operating state of the automatic transmission 13.

By contrast, if the operating state of the automatic transmission 13 is not changed so that the answer of step S253 is NO, the routine skips step S206 and proceeds to step S207. At step S207, a total output torque is calculated by adding all of the torque changes calculated at steps S202, S204, and S206, and the calculated total output torque is then converted into a torsion rate. A torsional vibration is caused when a balance point of an elastic member arranged in the vehicle is changed due to a change in the output torque of the engine 1. Specifically, the total output torque is converted into a ratio between a maximum output torque and a minimum output torque of the engine 11. The converted value is employed as a first torsion rate.

Then, at step S208, the torsional change determiner 48 determines whether or not the drive state of the vehicle 10 is switched between the drive state and the driven state on the basis of the speed difference between the input shaft 12 and the output shaft 21. If the drive state is switched so that the answer of step S208 is YES, the routine proceeds to step S209. By contrast, if the drive state is not switched so that the answer of step S208 is NO, the routine skips step S209 and proceeds to step S210.

At step S209, the torsional change determiner 48 corrects the first torsion rate based on the amplification rate of the output torque determined at step S100 shown in FIG. 5, and the corrected torsion rate is employed as a second torsion rate. Specifically, the first torsion rate is increased depending on the torque amplification rate. Further, a torsion in the counter direction (opposite to the rotational direction of the engine 11) is converted into a torsion in the forward direction, and the converted torsion is added to the second torsion rate.

At step S210, the second torsion rate thus calculated is stored in the storage unit 49. Then, at step S211, a rate of torsional change is calculated based on a difference between the previous second torsion rate stored in the storage unit 49 and the current second torsion rate. The rate of torsional change is used to estimate a magnitude of torsional vibration caused in the vehicle 10.

Figure 8:
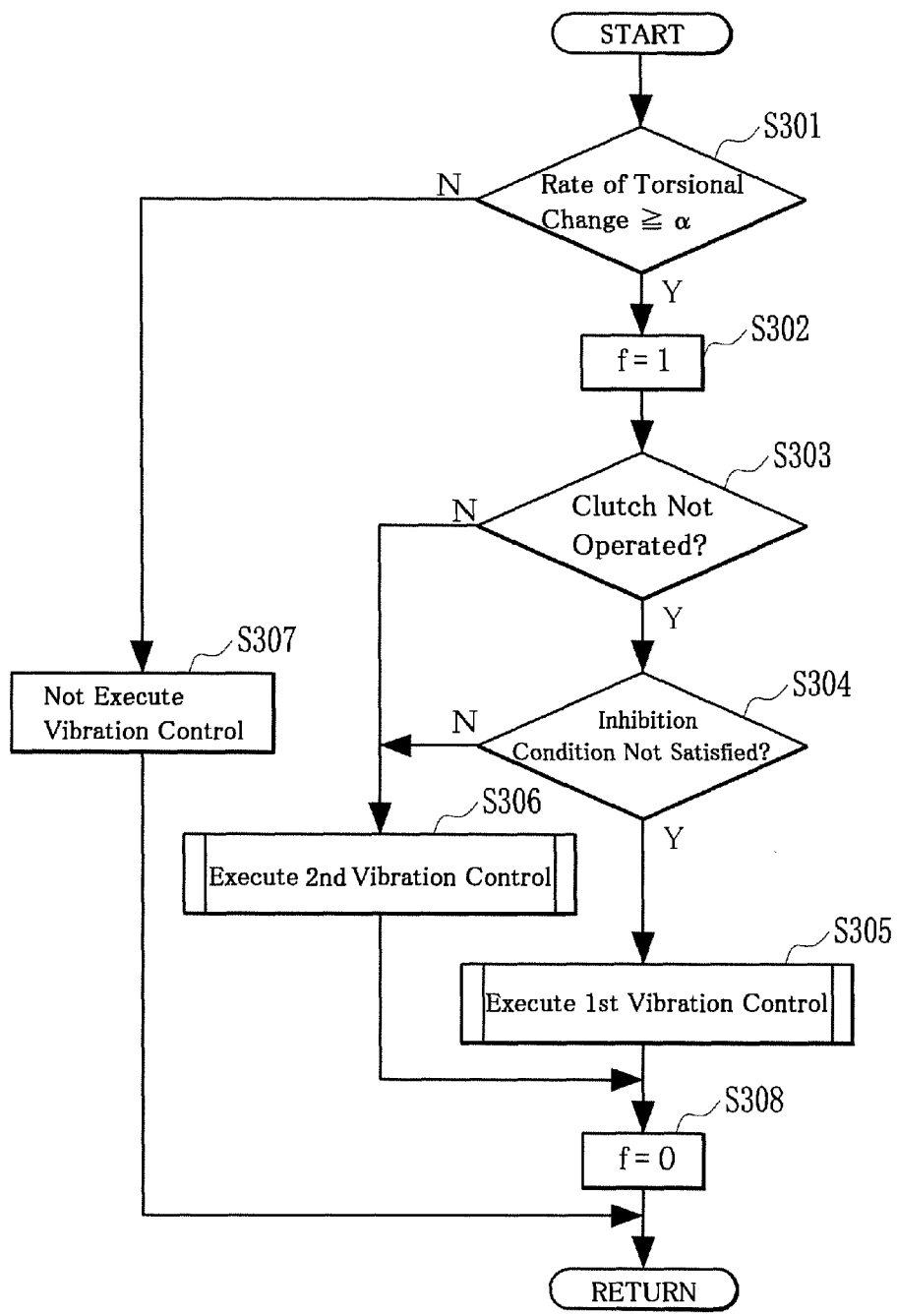
FIG. 8 is a flowchart illustrating an operation procedure of a vibration control selector.

FIG. 8 is a flowchart showing a subroutine of step S300 in FIG. 5 performed by the vibration control selector 50. The operations of the vibration control selection unit 50 illustrated in FIG. 8 are also performed repeatedly at certain time intervals as long as the engine 11 is in operation. At step S301, the vibration control selector 50 determines whether or not the rate of torsional change determined by the torsional change determiner 48 is equal to or greater than a predetermined threshold value $\alpha$. The threshold $\alpha$ is set to a value at which a passenger does not feel a longitudinal torsional vibration in the vehicle 10. If the rate of torsional change is equal to or greater than the threshold $\alpha$ so that the answer of step S301 is YES, the routine proceeds to step S302 to perform the vibration control. By contrast, if the rate of torsional change is smaller than the threshold $\alpha$ so that the answer of step S301 is NO, the routine proceeds to step S307 to not to execute the vibration control and then returned.

At step S302, an execution flag "f" for performing the vibration control is turned on as indicated by "1". Then, at step S303, the vibration control selector 50 determines whether or not the engagement devices 14 and 15 are currently in operation to shift the gear stage. If the engagement devices 14 and 15 are not in operation so that the answer of step S303 is YES, the routine proceeds to step S304 to determine satisfaction of any specific inhibition condition (e.g., an excessive raise in an oil temperature etc.). By contrast, if the engagement devices 14 and 15 are currently in operation so that the answer of step S303 is NO, the routine proceeds to step S306 to execute the second vibration control. If none of the inhibition condition is satisfied so that the answer of step S304 is YES, the routine proceeds to step S305 to execute the first vibration control. By contrast, if any of the inhibition condition is satisfied so that the answer of step S304 is NO, the routine also proceeds to step S306 to execute the second vibration control.

At step S305, the vibration control selector 50 outputs a command to perform the first vibration control to the first vibration controller 51. At step S306, the vibration control selector 50 outputs a command to perform the second vibration control to the second vibration controller 54. After the first vibration control and the second vibration control are performed, the execution flag "f" is turned off as indicated by "0" at step S308, and then the routine is returned.

Figure 9:
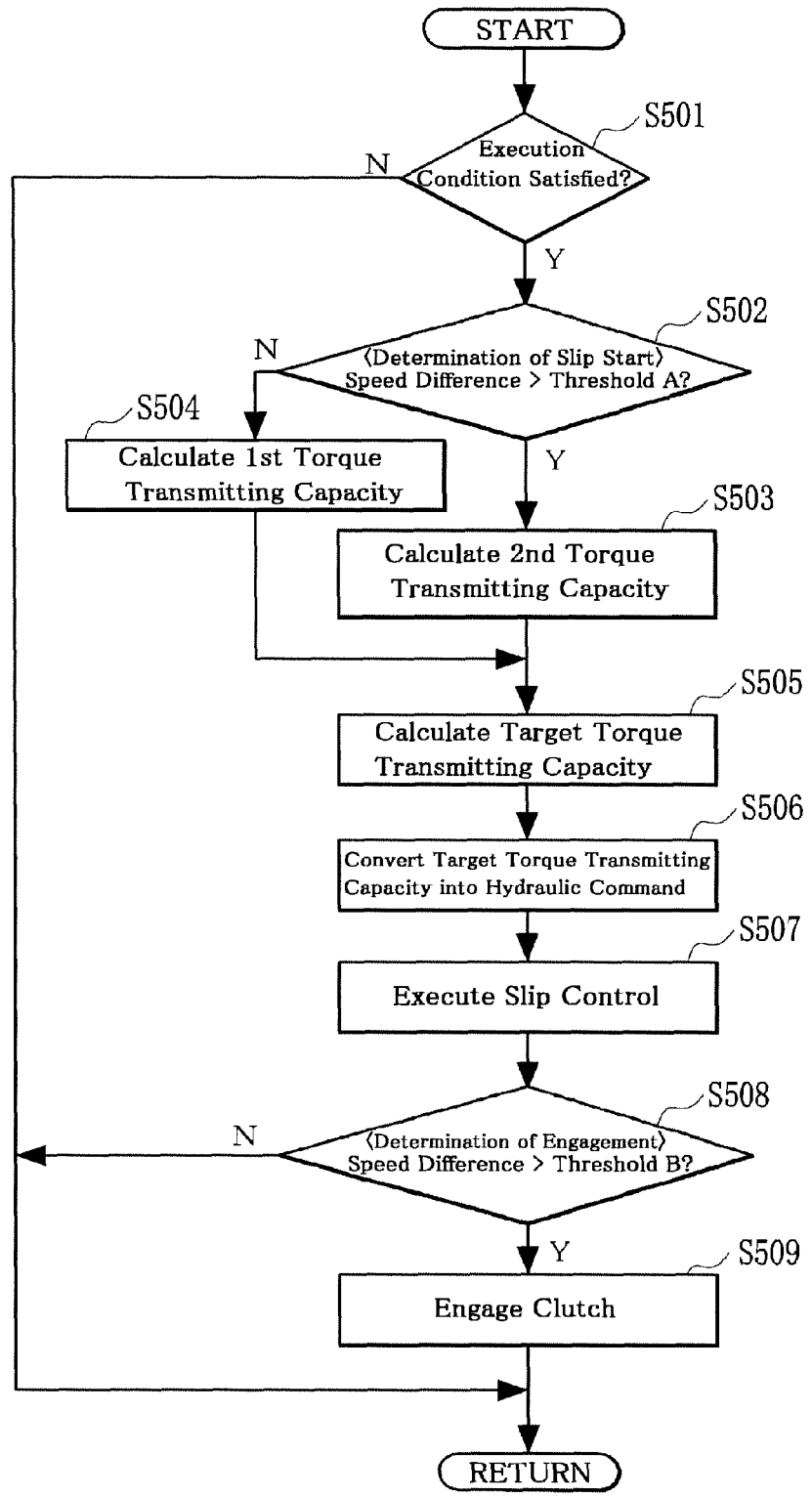
FIG. 9 is a flowchart illustrating an operation procedure of a first vibration controller.

FIG. 9 is a flowchart showing a subroutine of step S500 in FIG. 5 performed by the first vibration controller 51. The operations of the first vibration controller 51 illustrated in FIG. 9 are also performed repeatedly at certain time intervals as long as the engine 11 is in operation. At step S501, the first vibration controller 51 determines whether or not the execution condition is satisfied (the execution flag "f" is turned to "1"). If the execution flag "f" is turned off so that the answer of step S501 is NO, the routine is returned. By contrast, if the execution flag "f" is turned to "1" so that the answer of step S501 is YES, the routine proceeds to step S502 to determine whether or not the speed difference between the input shaft 12 and the output shaft 21 is greater than a predetermined threshold value "A". If the speed difference is greater than the threshold value A so that the answer of step S502 is YES, the first vibration controller 51 determines an occurrence of slip in the engagement devices 14 and 15, and the routine proceeds to step S503. By contrast, if the speed difference is smaller than the threshold value A so that the answer of step S502 is NO, the first vibration controller 51 determines that the engagement devices 14 and 15 are engaged without causing a slip, and the routine proceeds to step S504. Specifically, the threshold value A is an upper limit of the speed difference at which the engagement devices 14 and 15 can be disengaged certainly without being effected by sensor noise or the like.

At step S503, the second torque transmitting capacity is calculated by adding the inertia torque of the engine 11 to the target engine torque. Here, provided that the inertia torque of the case in which the engine speed is increased is a positive inertia torque, and that the inertia torque of the case in which the engine speed is decreased is a negative inertia torque, an engagement torque Tc1 (i.e., a clutch torque capacity) of the engagement devices 14 and 15 can be calculated using the following formula:

$$Tc1 = \text{clutch torque contribution rate} \times (Teg + Je \times d\omega e/dt) \quad (1);$$

where Teg is the target engine torque, Je is an engine inertia, and dωe/dt is an engine angular velocity.

That is, when the engagement devices 14 and 15 are in the slip state, the second torque transmitting capacity is determined at step S503 based on the amount change in inertia of the engine 11 that is largest in the drive system.

By contrast, if the speed difference is smaller than the threshold value A so that the answer of step S502 is NO, the routine progresses to step S504 to calculate the first torque transmitting capacity by multiplying the estimated target engine torque by: the rate of torsional change calculated by the routine shown in FIG. 7; and the torque amplification rate calculated by the routine shown in FIG. 6. That is, when the engagement mechanisms 14 and 15 do not slip, the first torque transmitting capacity is determined at step S504 based on the torque amplification rate caused by backlash reduction, and a magnitude of vibration caused in the vehicle 10.

At step S505, the contribution ratio of the first engagement device 14 to transmit the engine torque is calculated based on the gear ratio between gears of input side and output side of the first engagement device 14, and the contribution ratio of the second engagement device 15 to transmit the engine torque is calculated based on the gear ratio between gears of input side and output side of the second engagement device 15. Then, a target torque transmitting capacity of the first engagement device 14 and a target torque transmitting capacity of the second engagement device 15 are determined based on the calculated contribution ratio of each of the first engagement device 14 and the second engagement device 15.

At step S506, the target torque transmitting capacity of the first engagement device 14 and the target torque transmitting capacity of the second engagement device 15 are individually converted into a hydraulic command, and the hydraulic commands of the first engagement device 14 and the second engagement device 15 are sent to the hydraulic control unit 40 to execute the slip control.

At step S508, the first vibration control unit 51 determines whether or not the speed difference between the input shaft 12 and the output shaft 21 is smaller than another threshold value "B". If the speed difference is smaller than the threshold value B so that the answer of step S508 is YES, the first vibration controller 51 determines that the engagement devices 14 and 15 are engaged without causing a slip, and the routine proceeds to step S509. At step S509, the hydraulic commands are increased to engage the engagement devices 14 and 15 completely, and then the routine is returned.

By contrast, if the speed difference is greater than the threshold value B so that the answer of step S508 is NO, the routine is returned to start the first vibration control again. Specifically, the threshold B is a lower limit the speed difference at which the engagement devices 14 and 15 can be disengaged certainly without being effected by sensor noise or the like.

Figure 10:
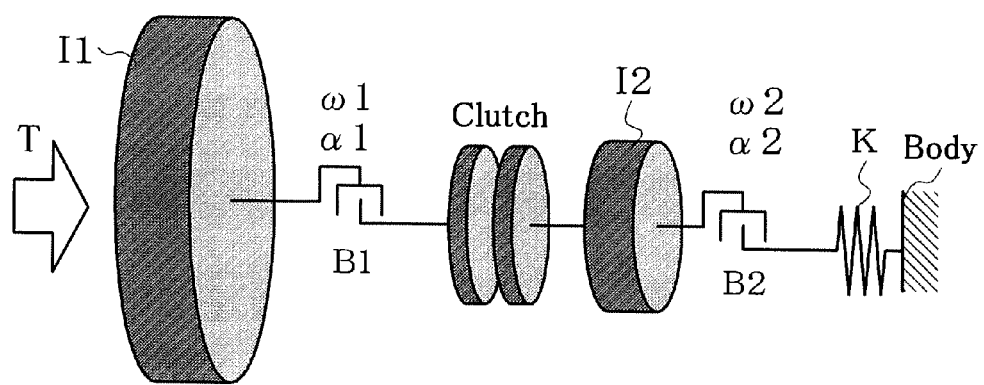
FIG. 10 is a schematic diagram illustrating a torsion model of a drive system including an automatic transmission.

As described, the backlash amplification rate as the exemplary torque amplification rate used at step S504 is determined at step S103 indicated in FIG. 6, but it may be calculated by use of a torsion model of the drive system illustrated in FIG. 10. FIG. 10 is a schematic diagram illustrating a torsion model of the drive system including the automatic transmission. In FIG. 10, I1 indicates an inertia moment of the engine system including the engine 11 as a power source, I2 indicates an inertial moment of the transmission system including the automatic transmission 13, B1 indicates the amount of backlash between the engine system and the automatic transmission 13, and B2 indicates the amount of backlash between the automatic transmission 13 and the vehicle (drive wheels). The engagement mechanisms 14 and 15 are illustrated as one clutch between the engine 11 and the automatic transmission 13 for the sake of illustration. For example, spring coefficient (torsion rigidity) K includes the output shaft (or the drive shaft) 21 and the tire system. ω1 and ω2 individually indicate an angular velocity when backlash B1 and B2 are reduced, ω0 indicates an initial value of angular velocity (angular speed at the start of backlash reduction), α1 and α2 individually indicate an angular velocity while backlash B1 and B2 are reduced, and t1 and t2 individually indicate a time when backlash B1 and B2 are reduced. Torque generated when backlash B1 and B2 are reduced can be calculated as impact energy by use of the torsion model of the vehicle.

The second drive torque is amplified when the first drive torque T is input into the backlash element to reduce backlash B1 and B2 and the torsion torque is input into the spring with the spring coefficient K. Here, formula (3) for calculating the angular speed ω1 when backlash B1 is reduced is derived by formula (1) for calculating impact energy E1 generated when backlash B1 is reduced and formula (2) expressing an temporal integration of torque in integral. Given that an energy loss rate β (0<β<1) when backlash B1 is reduced, formula (4) for calculating the impact energy E1 can be derived. "ω1" in formula (4) represents an angular velocity when the engine system inertia moment I1 and the transmission system inertial moment I2 are integral with each other after backlash B1 is reduced. Similarly, formula (7) for calculating the angular velocity ω2 when backlash B2 is reduced is derived by formula (5) for calculating impact energy E2 generated when backlash B2 is reduced and formula (6) expressing temporal integration of torque in integral. Consequently, formula (8) for calculating the impact energy E2 can be derived by formulas (1) to (7). It can be seen that the impact energy E2 in formula (8) is largely influenced by the inertial of the engine 11 and backlash B2.

Specifically, the above-mentioned formulas are expressed as follows:

$$E_1 = \frac{1}{2} \cdot I_1 \cdot \omega_1^2; \tag{2}$$

$$\int_0^{t_1} \omega dt = B_1; \tag{3}$$

$$\omega_1 = \sqrt{\omega_0^2 + 2\alpha_1 B_1}; \tag{4}$$

$$(1-\beta)1/2(I_1\omega_1) = \frac{1}{2(I_1+I_2)\omega_1'^2}; \tag{5}$$

$$E_2 = \frac{1-\beta}{2} I_1 \omega_1^2; \tag{6}$$

$$\int_{t_1}^{t_2} \omega dt = B_2; \tag{7}$$

$$\omega_2 = \sqrt{\omega_1'^2 + 2\alpha_2 B_3}; \text{ and} \tag{8}$$

$$E_2 = \frac{1-\beta}{2} I_1 \omega_0^2 + T\{(1-\beta)B_1 + B_2\}. \tag{8}$$

Figure 11:
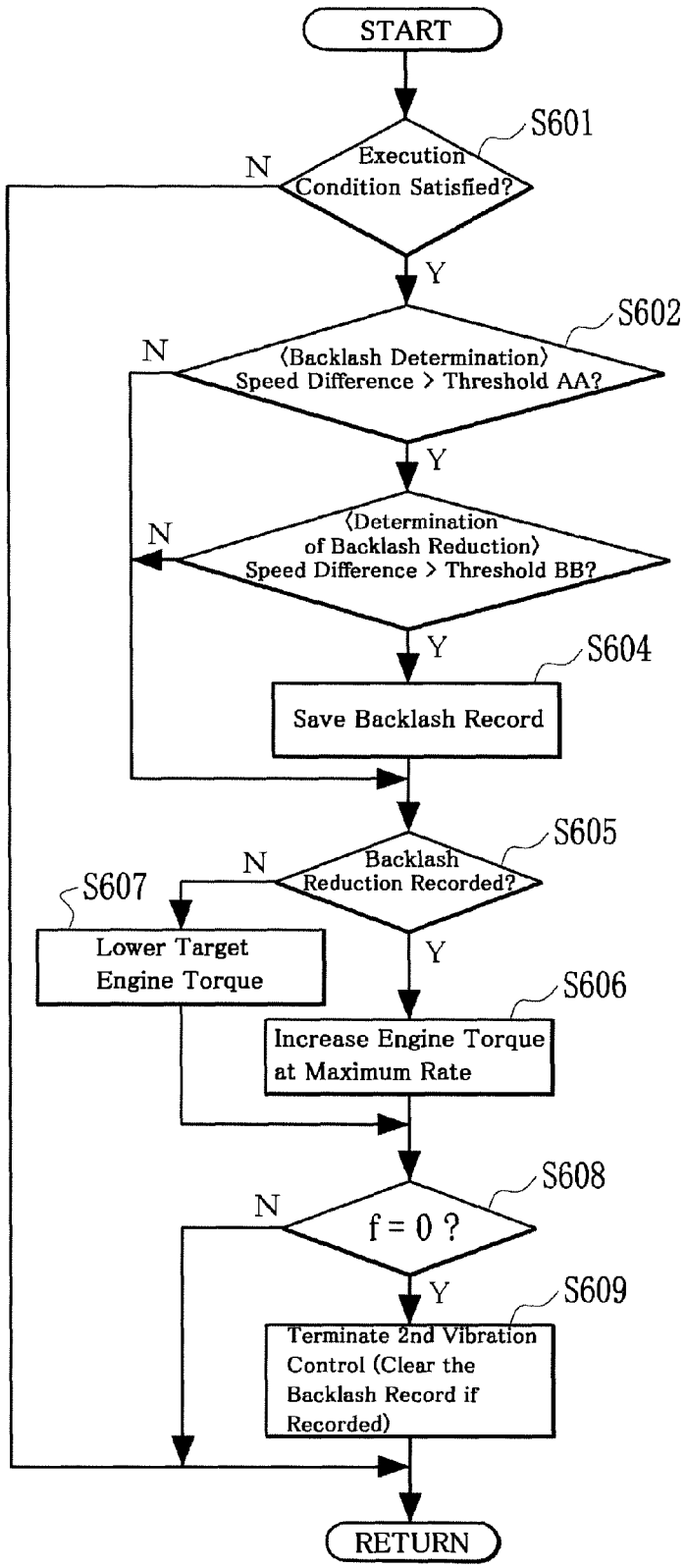
FIG. 11 is a flowchart illustrating an operation procedure of a second vibration controller.

FIG. 11 is a flowchart showing a subroutine of step S600 in FIG. 5 performed by the second vibration controller 54. The operations of the second vibration controller 54 illustrated in FIG. 11 are also performed repeatedly at certain time intervals as long as the engine 11 is in operation. At step S601, the second vibration controller 54 determines whether or not the execution condition is satisfied (the execution flag "f" is turned to "1"). If the execution flag "f" is turned off so that the answer of step S601 is NO, the routine is returned. By contrast, if the execution flag "f" is turned to "1" so that the answer of step S601 is YES, the routine proceeds to step S602 to determine whether or not the speed difference between the input shaft 12 and the output shaft 21 is greater than a predetermined threshold value "AA". If the speed difference is greater than the threshold value AA so that the answer of step S602 is YES, the second vibration controller 54 determines that the backlash exists between the predetermined gears, and the routine proceeds to step S603. By contrast, if the speed difference is smaller than the threshold value A so that the answer of step S602 is NO, the second vibration controller 54 determines that the backlash is reduced, and the routine proceeds to step S605.

At step S603, the second vibration controller 54 determines whether or not the speed difference is smaller than another threshold BB. If the speed difference is smaller than another threshold BB so that the answer of step S603 is YES, the second vibration controller 54 determines that the backlash is reduced, and the routine proceeds to step S604. By contrast, if the speed difference is greater than another threshold BB so that the answer of step S603 is NO, the second vibration controller 54 determines that backlash exist between the predetermined gear pair, and the routine proceeds to step S605. At step S604, determination results at steps S602 and S603, that is, information about existence of the backlash is stored in the storage device 55 shown in FIG. 3.

At step S605, the second vibration controller 54 determines whether or not the existence of the backlash is recorded in the storage device 55. If the existence of the backlash has been recorded so that the answer of step S605 is YES, and the routine proceeds to step S606. By contrast, if the existence of the backlash has not been recorded so that the answer of step S605 is NO, the second vibration controller 54 determines that backlash exists, and the routine proceeds to step S607. At step S606, a target engine torque is set in such a manner as to be increased at a maximum rate with reference to a torque map determining a torque curve. In this case, the ECU 26 controls the opening degree of the accelerator in such a manner as to increase the engine torque at the maximum rate so that the torsional vibration can be suppressed while improving acceleration response.

At step S607, the target engine torque is set to a relatively lower value so as to reduce the backlash. In this case, the ECU 26 controls the opening degree of the accelerator in such a manner as to increase the engine torque to the relatively lower target value so that an occurrence of shock resulting from the backlash reduction can be prevented.

Then, at step S608, it is determined whether or not the execution flag "f" is turned to "0". If the execution flag "f" is turned to "0" so that the answer of step S608 is YES, the routine proceeds to step S609 to terminate the second vibration control. By contrast, if the execution flag "f" is still turned on so that the answer of step S608 is NO, the routine is returned.

Figure 12:
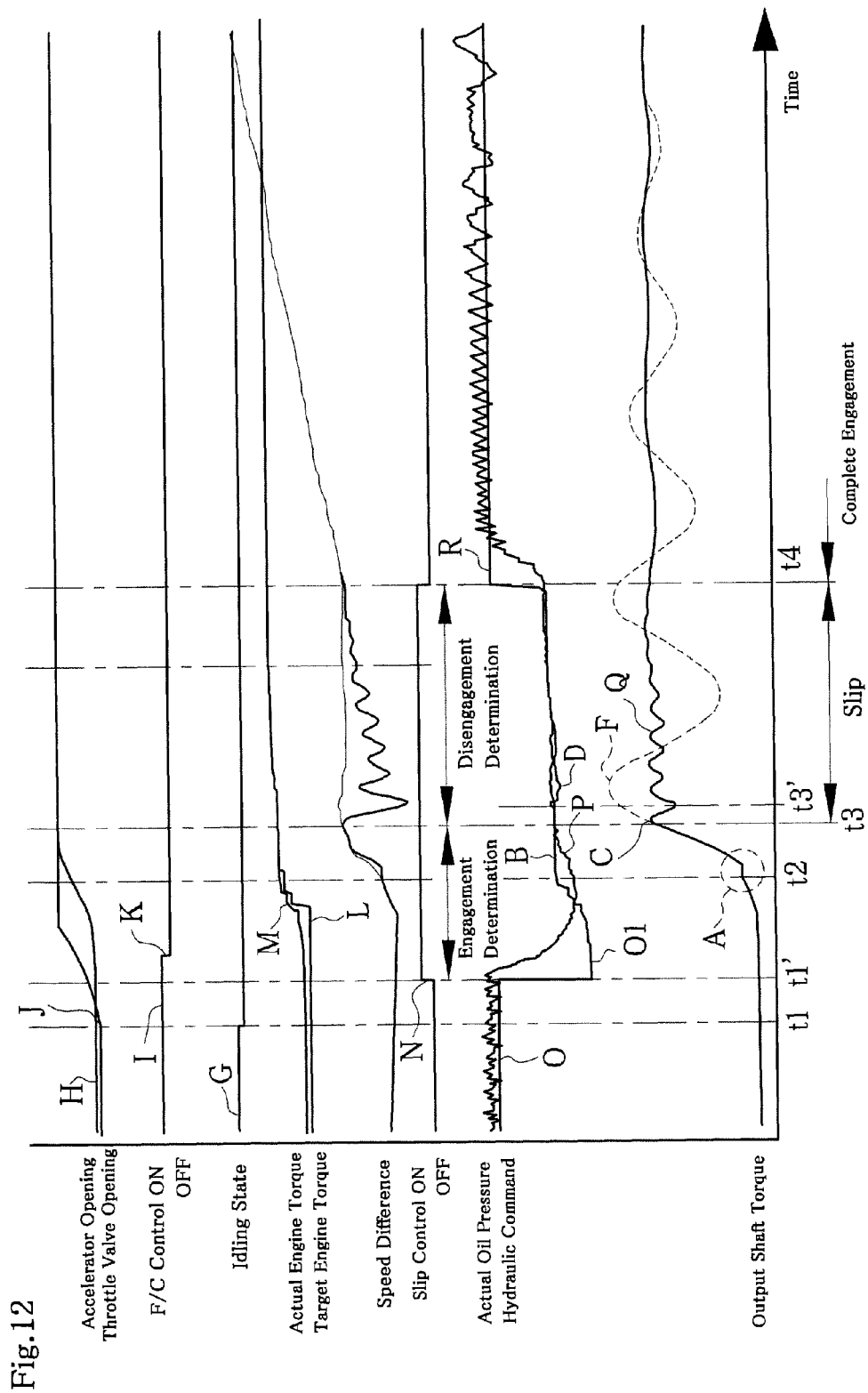
FIG. 12 is a time chart illustrating exemplary slip control.

FIG. 12 is a time chart showing an exemplary slip control.

Before point t1, the vehicle 10 is coasting and the hydraulic command (represented by "O") is raised to a level to engage the engagement device 14 or 15. In this situation, an opening degree of the throttle valve (represented by "H") is reduced to zero so that the engine is idling (as indicated by "G"), and the F/C control is executed (as indicated by "I") to cutoff fuel supply to the engine 11. The fuel supply to the engine 11 is restarted when the accelerator pedal is depressed.

At point t1, the accelerator pedal (represented by "J") is depressed. Consequently, the opening degree of the throttle valve is increased with a slight delay, and the F/C control is terminated (as indicated by "K") to start fuel supply to the engine 11. In this situation, the target engine torque (represented by "M") is gradually increased with the increase in the opening degree of the throttle valve so that the actual engine torque (represented by "L") is increased stepwise, and the hydraulic command to the engagement device 14 or 15 is changed in association with an estimated value of the target engine torque (represented by "M"). Since the target engine torque has not yet been increased even after point t1, the hydraulic command to the engagement device 14 or 15 is lowered at point t1' to almost zero (as indicated by "O1"). In FIG. 12, an actual hydraulic pressure of the engagement device 14 or 15 is represented by "P".

The vibration controller 31 continuously observes the rate of torsional change, and turns on the execution flag "f" (as indicated by "N") for performing the first vibration control as the slip control when the estimated rate of torsional change exceeds the threshold α. When performing the first vibration control, the first vibration control unit 51 determines the first torque transmitting capacity by multiplying the first drive torque by the torque amplification rate calculated based on the backlash coefficient, and transmits the hydraulic command (represented by "B") for reducing an engagement pressure to the hydraulic control unit 40 so as to achieve the first torque transmitting capacity.

At point t2, the second drive torque exceeds the first drive torque due to backlash reduction (as indicated by "A"), and consequently the engagement device 14 or 15 starts causing a slip from point t3. Then, the speed difference between the input shaft 12 and the output shaft 21 exceeds the threshold value "A" at time t3' and hence the first vibration controller 51 determines an occurrence of the engagement device 14 or 15 as described at step S502 in FIG. 9. In this situation, the first vibration controller 51 transmits a hydraulic command value (as indicated by "D") to the hydraulic control unit 40 to establish the second torque transmitting capacity that is smaller than the first torque transmitting capacity.

The first vibration control unit 51 determines the first torque transmitting capacity and the second torque transmitting capacity each time when the engagement state of the engagement device 14 or 15 is change, and transmit the hydraulic command to achieve the determined torque transmitting capacity. For this reason, a relation between the engine torque and the torque transmitting capacity of the engagement device 14 or 15 is balanced (the speed difference is reduced to almost zero) gradually. Consequently, rotational speeds of the input member and the output member of the engagement device 14 or 15 causing a slip are gradually synchronized with each other. In this situation, the first vibration control unit 51 transmits the hydraulic command to engage the engagement device 14 or 15 (as indicated by "R") completely at point t4.

If the first vibration control is not performed, a torsional vibration of low frequency is generated on the output shaft (drive shaft) 21 by a pulsation of the engine torque to provide discomfort to passengers. However, the low frequency component (represented by "F") of the torque of the output shaft 21 is converted into a high frequency component (represented by "Q") by the slight slippage of the engagement device 14 or 15. Since the low frequency component of the output shaft torque is eliminated, longitudinal vibrations of the vehicle 10 resulting from the backlash reduction can be suppressed during a period from the point at which the accelerator pedal is depressed to the point at which the first drive torque is raised to the target engine torque.

In addition, since the vibrations caused by the energy amplified as a result of backlash reduction are suppressed by causing a slip of the engagement device 14 or 15 to convert the frequency of the vibrations, the engagement device, the engagement device 14 or 15 can be engaged promptly utilizing a torsional reaction force. Further, since the engagement device 14 or 15 is caused to slip only slightly, an energy loss can be reduced to save the fuel and damage on the frictional member can be limited.

Although the above exemplary embodiment of the present application have been described, it will be understood by those skilled in the art that the present application should not be limited to the described exemplary embodiment, and various changes and modifications can be made within the spirit and scope of the present application. For example, the prime mover may include an internal-combustion engine and a motor. In addition, the automatic transmission 13 may be provided with three or more engagement devices to increase selection of gear stage.

Figure 13:
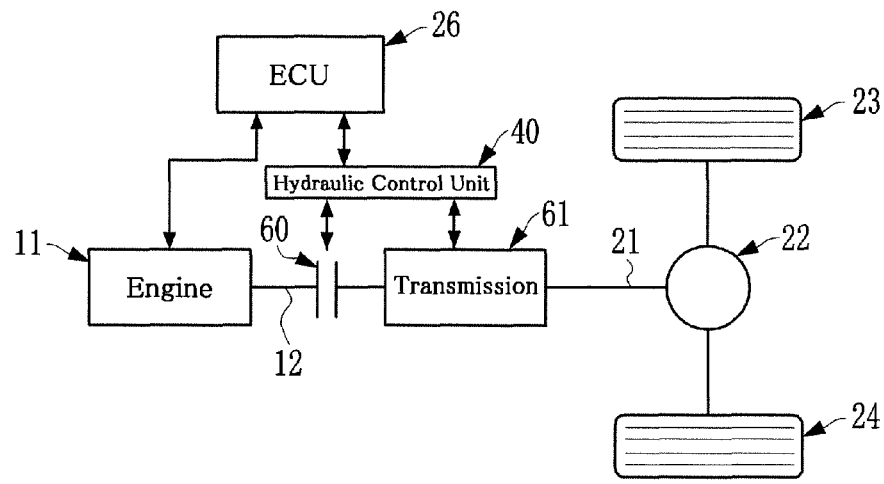
FIG. 13 is an explanatory diagram illustrating another embodiment using a starting clutch.

FIG. 13 shows another example of the vehicle to which the control system according to the embodiment is applied. In the vehicle shown in FIG. 13, only one starting clutch 60 is arranged between the engine 11 and a transmission 61 to selectively provide a torque transmission therebetween. As illustrated in FIG. 13, a torque transmitting capacity of the starting clutch 60 is changed in accordance with hydraulic pressure applied from the hydraulic control unit 40. For example, a frictional clutch whose torque transmitting capacity is controlled hydraulically such as a multiple-plate clutch may be used as the starting clutch 60. The transmission 61 includes an automatic geared transmission in which a gear stage is changed stepwise and a continuously-variable transmission whose speed ratio is varied continuously. According to another example, the ECU 26 executes the first vibration control using the starting clutch 60, and the starting clutch 60 may be incorporated into the transmission 61.

Figure 14:
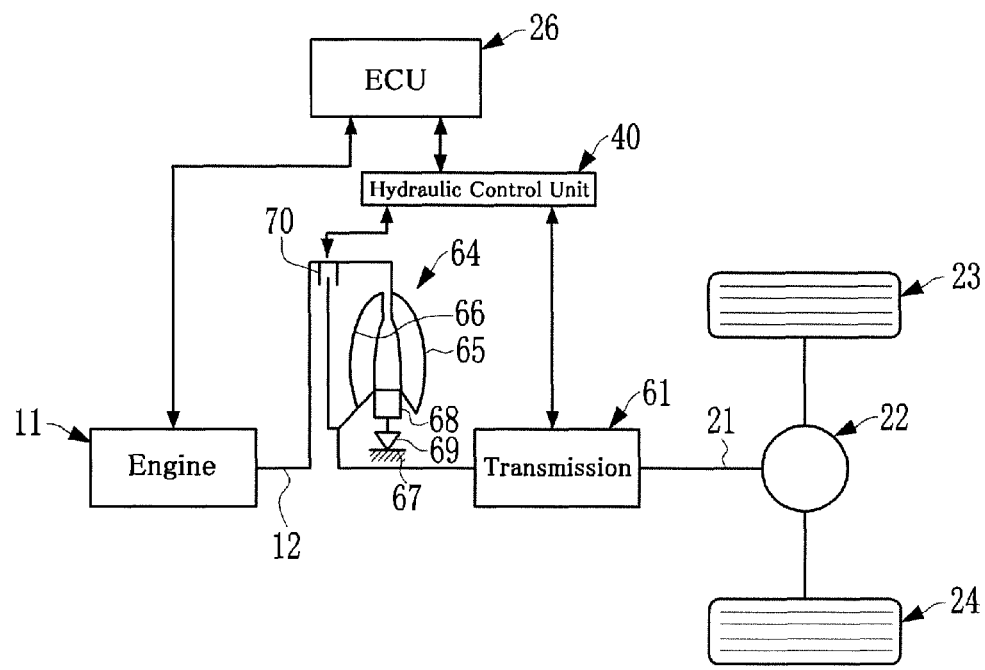
FIG. 14 is an explanatory diagram illustrating still another embodiment using a lockup clutch.

FIG. 14 shows still another example of the vehicle to which the control system according to the embodiment is applied. In the vehicle shown in FIG. 14, the slip control is applied to a lockup clutch 70 of a torque converter 64 arranged between the engine 11 and the transmission 61, instead of the engagement devices 14 and 15. The torque converter 64 comprises a pump impeller 65 rotated by the engine 11, a turbine liner 66 rotated by a spiral flow of oil caused by the pump impeller 65, and a stator 68 fixed to a predetermined stationary member 67 through a one-way clutch 69 between the pump impeller 65 and the turbine liner 66. The lockup clutch 70 selectively provides a connection between the pump impeller 65 and the turbine liner 66 on the basis of a hydraulic pressure delivered from the hydraulic control unit 40. According to another example, the ECU 26 executes the first vibration control using the lockup clutch 70.

What is claimed is:

1. A vehicle control system, comprising:
    an engagement device that is disposed on a power transmission route between a prime mover and drive wheels, and that is engaged to transmit a first drive torque generated by the prime mover to the drive wheels and disengaged to interrupt transmission of the first drive torque;
    a control unit that controls hydraulic pressure applied to the engagement device thereby changing a torque transmitting capacity of the engagement device; and
    a vibration controller that reduces torsional vibrations of a vehicle,
    wherein the vibration controller is configured to set the torque transmitting capacity of the engagement device to a first torque transmitting capacity that is smaller than a value required to transmit a peak value of a second drive torque applied to an output shaft of a transmission having the engagement device but greater than a value required to transmit an estimated first drive torque, when the second drive torque is amplified by pulsation of the first drive torque.

2. The vehicle control system according to claim 1, wherein the vibration controller is further configured to increase the first torque transmitting capacity with an increase in amplification of the second drive torque resulting from backlash reduction in at least one pair of engagement elements arranged in the power transmission route.

3. The vehicle control system according to claim 2, wherein the vibration controller is further configured to set the torque transmitting capacity of the engagement device to a second torque transmitting capacity that is greater than a value required to transmit the estimated first drive torque but smaller than the first torque transmitting capacity.

4. The vehicle control system according to claim 3, wherein the vibration controller is further configured to:
    convert the estimated first drive torque to a rate of torsional change, and set the torque transmitting capacity of the engagement device to the first torque transmitting capacity, if the rate of torsional change resulting from an amplification of the first drive torque is equal to or greater than a predetermined threshold value.

5. The vehicle control system according to claim 4, wherein the vibration controller is further configured to adjust the first torque transmitting capacity to be smaller than a value required to transmit the peak value of the second drive torque by multiplying the estimated first drive torque by a torque amplification rate.

6. The vehicle control system according to claim 3, wherein the vibration controller is further configured to adjust the first torque transmitting capacity to be smaller than a value required to transmit the peak value of the second drive torque by multiplying the estimated first drive torque by a torque amplification rate.

7. The vehicle control system according to claim 2, wherein the vibration controller is further configured to:
convert the estimated first drive torque to a rate of torsional change, and
set the torque transmitting capacity of the engagement device to the first torque transmitting capacity, if the rate of torsional change resulting from an amplification of the first drive torque is equal to or greater than a predetermined threshold value.

8. The vehicle control system according to claim 7, wherein the vibration controller is further configured to adjust the first torque transmitting capacity to be smaller than a value required to transmit the peak value of the second drive torque by multiplying the estimated first drive torque by a torque amplification rate.

9. The vehicle control system according to claim 2, wherein the vibration controller is further configured to adjust the first torque transmitting capacity to be smaller than a value required to transmit the peak value of the second drive torque by multiplying the estimated first drive torque by a torque amplification rate.

10. The vehicle control system according to claim 1, wherein the vibration controller is further configured to:
convert the estimated first drive torque to a rate of torsional change, and
set the torque transmitting capacity of the engagement device to the first torque transmitting capacity, if the rate of torsional change resulting from an amplification of the first drive torque is equal to or greater than a predetermined threshold value.

11. The vehicle control system according to claim 10, wherein the vibration controller is further configured to adjust the first torque transmitting capacity to be smaller than a value required to transmit the peak value of the second drive torque by multiplying the estimated first drive torque by a torque amplification rate.

12. The vehicle control system according to claim 1, wherein the vibration controller is further configured to adjust the first torque transmitting capacity to be smaller than a value required to transmit the peak value of the second drive torque by multiplying the estimated first drive torque by a torque amplification rate.

* * * * *